(12) United States Patent
Treu

(10) Patent No.: US 6,170,184 B1
(45) Date of Patent: Jan. 9, 2001

(54) INDICATOR DEVICE

(76) Inventor: Massimo Treu, Vis P.M. Zaguri, 57 36100 Vicenza (IT)

(*) Notice: Under 35 U.S.C. 154(b), the term of this patent shall be extended for 0 days.

(21) Appl. No.: 09/414,477

(22) Filed: Oct. 7, 1999

(30) Foreign Application Priority Data

Oct. 16, 1998 (IT) .............................. VI980085 U

(51) Int. Cl.⁷ .................................... G09B 21/02

(52) U.S. Cl. ................ 40/625; 40/584; 434/113

(58) Field of Search .............. 40/625, 547, 538, 40/585, 584, 616; 411/399, 339, 338, 512, 907, 908; 434/112, 113

(56) References Cited

U.S. PATENT DOCUMENTS 2,160,686 * 5/1939 Spaine et al. .................. 411/339
5,720,616 * 2/1998 Schuler, III ..................... 434/113

* cited by examiner

*Primary Examiner*—Cassandra H. Davis
(74) *Attorney, Agent, or Firm*—R. Neil Sudol; Henry D. Coleman; William J. Sapone

(57) ABSTRACT

An indicator device includes a support member formed by two coupled flat panels made of metal or synthetic material, a plurality of holes formed in the exposed panel according to the pattern of Braille writing according to the characters to be represented; the holes are engaged by pins made of synthetic material which is resistant to abrasion and to rubbing-induced wear, so that their dome-shaped rounded ends protrude from the exposed panel.

5 Claims, 1 Drawing Sheet

INDICATOR DEVICE

BACKGROUND OF THE INVENTION

1. Field of the Invention

The present invention relates to an indicator device which is particularly but not exclusively useful for visually-impaired and blind people in order to allow them to easily identify a place, an office, a direction et cetera.

2. Description of the Prior Art

It is known that the Braille system allows blind people to read by means of an array of raised dots which symbolize alphanumeric characters. Essentially, each letter and digit is written by mechanical punching on paper or other medium at some of the nodes of a two-by-three grid. Accordingly, by composing one or more grids which are punched in a horizontal direction one obtains words, etc. Reading is achieved by gently running one's fingertips along the resulting lines. This writing and reading system can also be applied to so-called place indicators in general and particularly to indicators of public bureaux, historical locations, hospitals and places of interest so as to enable blind people to autonomously recognize them. In the general effort of eliminating physical barriers for the benefit of the handicapped, it has been thought to associate short messages of one, or at the most two, words in Braille to traditional indications, mostly placed on signs or plates or similar media. For example, Braille strips of plastic-coated paper-like material are glued onto existing plates, signs, plaques, name plates, or similar. This solution is effective in itself, but it has the drawback that the strips deteriorate in the medium-long term, due to repeated contact, and degrade the overall aesthetic appearance of the plate. In new plates, the Braille studs are obtained by molding. A first drawback of this method is the fact that a specific mold must be provided for each plate, and if the plate is produced in a limited number of items this aspect considerably affects the retail price of the plate. A second equally important drawback is that this method is difficult to use with metals and metallic alloys such as for example aluminum, copper and zinc-aluminum-magnesium alloys and entails considerably high production costs.

An aim of the present invention is to overcome the drawbacks of the cited prior art.

An object of the invention is to provide an indicator device which can be manufactured with any type of support material at a considerably lower production cost than the conventional methods, so as to induce purchasers to buy and use the device even where it is not expressly required.

Another object of the invention is to provide an indicator device which is resistant to abrasion and rubbing-induced wear and has a pleasant appearance.

Another object of the invention is to provide an indicator device which allows to write and read any indication in Braille.

SUMMARY OF THE INVENTION

This aim, these objects and others which will become apparent hereinafter are achieved by an indicator device according to the invention, comprising a support member having a plurality of holes engaged by protruding pins which are detectable to the touch.

Further characteristics and advantages of the invention will become apparent from the description of an embodiment which is illustrated only by way of non-limitative example in the accompanying drawing.

DESCRIPTION OF THE PREFERRED EMBODIMENTS OF THE INVENTION

Figure 1:
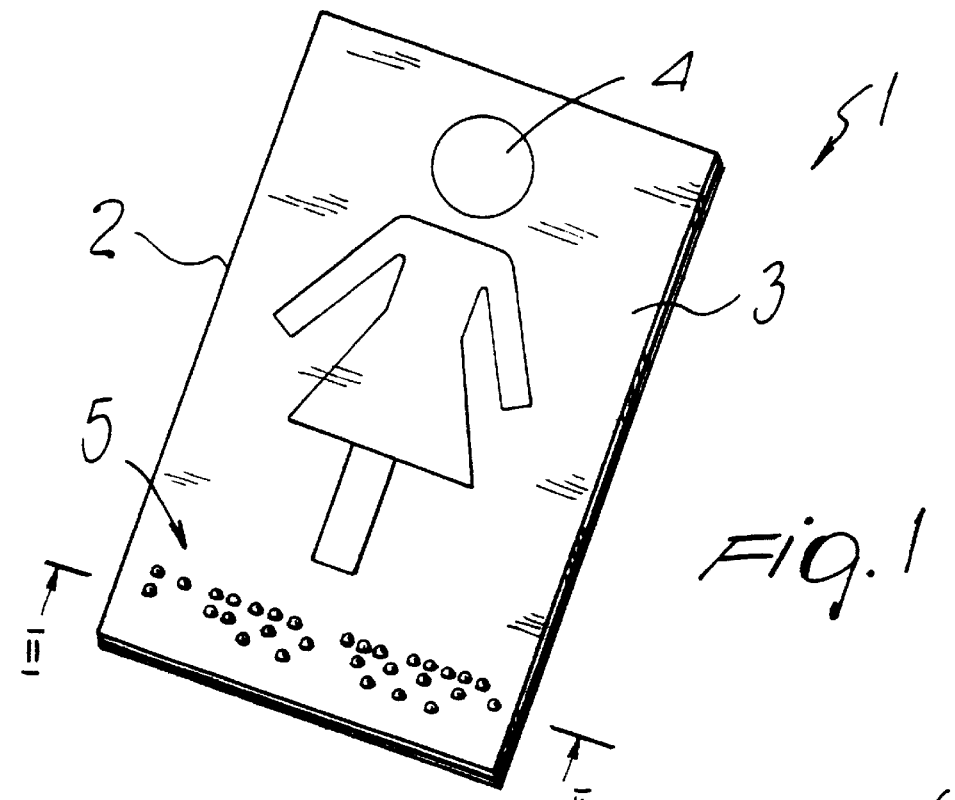
FIG. 1 is a perspective view of an indicator device according to the invention.
Figure 2:
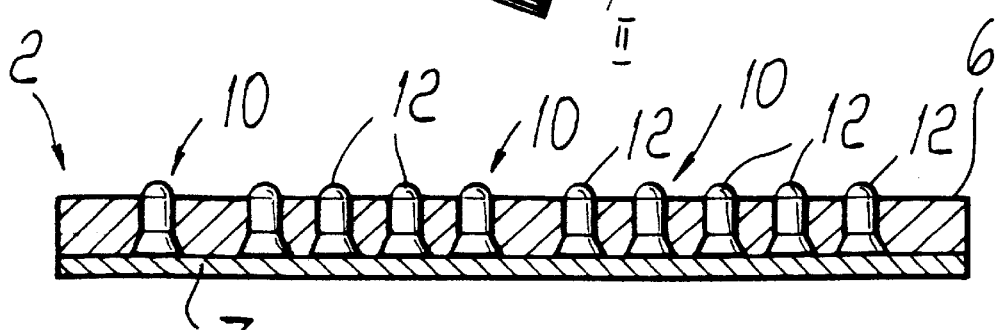
FIG. 2 is a sectional view of the indicator device, taken along the plane II—II of FIG. 1.
Figure 3:
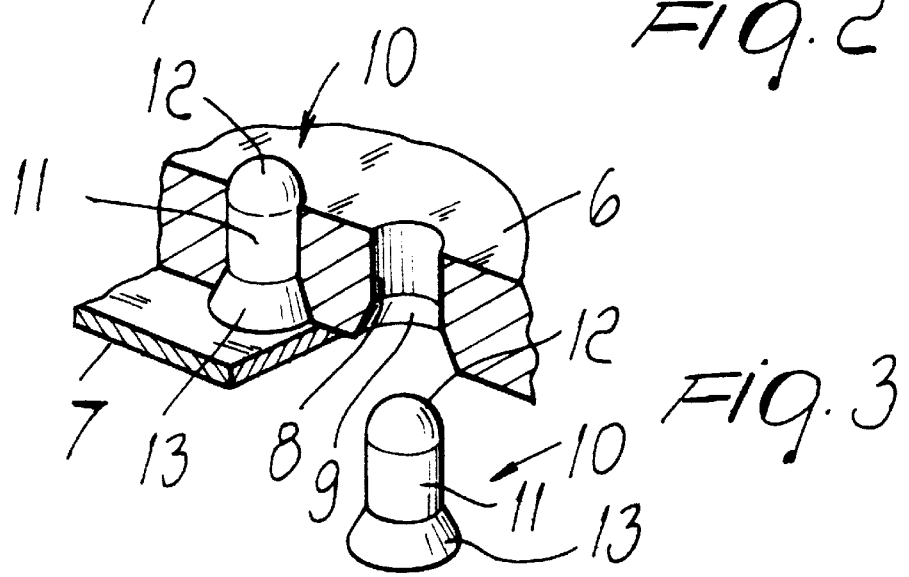
FIG. 3 is a partially sectional detail view of the indicator device of FIG. 1.

With reference to the drawings, the indicator device, globally designated by the reference numeral 1, comprises a support member 2 having a visible face 3 and provided with a conventional indication 4, for example provided by printing engraving, by means of an adhesive image, or in relief. The visible face 3 is also provided with an indication for visually-impaired and blind people, generally designated by the reference numeral 5, formed in Braille. The support member 2 comprises an upper exposed flat panel 6, preferably a metal or synthetic plate with desired characteristics in terms of rigidity and dimensional stability, which is coupled, by means for example of an adhesive, to a lower flat closure panel 7 which is optionally thinner than the upper panel 6, since it merely serves to close the upper panel. A plurality of through holes 8, that follow the pattern of Braille writing according to the alphanumeric characters to be represented are provided in the upper panel 6. Holes 8 have a radial size on the order of one millimeter and end with a flared portion 9 at the interface between the two panels 6 and 7. Pins 10 are inserted in the holes 8 and are taller than the depth of the holes 8 and than the thickness of the upper panel 6. The pins are formed by a cylindrical stem 11, having radial dimensions approximately equal to those of the holes 8, and which ends with a dome-shaped rounded end 12 which protrudes with respect to the exposed face 3. The stem 11 also has a cone-shaped opposite end 13 so as to adapt to the flared portion 9. Pins 10 are preferably made of a synthetic material which is particularly resistant to abrasion and to rubbing-induced wear. As an alternative, instead of the flared portion 9 there is a wider cylindrical portion (not shown) which accommodates a corresponding wider cylindrical head (not shown) provided on the pin instead of the conical end 13. The method for manufacturing the indicator device 1 comprises the following steps:

providing a plurality of through holes 8 on the upper panel 6;

inserting a plurality of pins 10 in the through holes 8, so that the pins protrude with their rounded end 12 from the panel 6;

locking the pins 10 by means of the closure panel 7, coupling it by means of adhesive to the panel 6.

It has been found in practice that the device thus described achieves the intended aim and objects, since the indicator device for visually-impaired and blind people is handy and straightforward to identify. Furthermore, the device can be assembled with a small number of simple operations which are typical of handicraft engraving and which can be effectively automated in case of large productions. Finally, by virtue of the device it is possible to produce any indication whatsoever, so as to allow visually-impaired and blind people to be fully autonomous in recognizing places, directions, et cetera.

In practice, the materials used, as well as the dimensions, may be any according to requirements.

What is claimed is:

1. A Braille indicator device comprising:
   a support panel having a plurality of through holes, said through holes each having a countersink portion at a rear side of said support panel;
   a plurality of pins inserted in respective ones of said through holes, said pins having of one end tactilely detectable ends protruding from a front side of said support panel, said pins each having a stem and a head portion at an opposite end end of said stem, the head portions of said pins being disposed in engagement with the countersink portions of said through holes said head portions corresponds in shape to said countersink portions; and
   a closure panel interfacing with said support panel along a rear side thereof.

2. The device according to claim 1 wherein the wider portions of said pins are flared.

3. The device according to claim 1 wherein the stems of said pins are cylindrical and wherein the detectable ends of said pins are dome-shaped.

4. The device according to claim 1 wherein said pins are made of synthetic resin material in various colors, said material being resistant to abrasion and rubbing-induced wear.

5. A method for manufacturing a Braille indicator device, comprising:
   producing a plurality of through holes in a support panel said holes having a countersink portion at a rear side of said panel;
   inserting a plurality of pins into said through holes from said rear side of said support panel so that said pins protrude from a front side of said support panel, said pins each having a head portion at one end of a stem, the inserting of said pins into said through holes including inserting the head portions of said pins into countersink portions of said through holes disposed along said rear side of said support panel said holes having a countersink portion at a rear side of said panel; and
   disposing a closure panel along said rear side of said support panel to thereby lock said pins into the respective ones of said through holes.

* * * * *